United States Patent Office 3,391,217
Patented July 2, 1968

3,391,217
LITHIUM CARBONATE STEAM CONVERSION TO LiOH IN IODINATIVE DEHYDROGENATION PROCESS
Herbert L. Benson, Jr., Houston, Tex., and George S. Mill, Westport, Conn., assignors to Shell Oil Company, New York, N.Y., a corporation of Delaware
No Drawing. Filed Mar. 17, 1966, Ser. No. 535,016
6 Claims. (Cl. 260—683.3)

ABSTRACT OF THE DISCLOSURE

The LiI-LiOH melt used for iodine recovery, in e.g., butadiene manufacture, accumulates carbonate from the oxidation step. Precipitation of lithium carbonate in aqueous purification of a slip stream wastes Li. The cleanup sludge is practically Li-free when the melt is kept low in carbonate by steam blowing at 450–650° C.

---

This invention relates to iodinative dehydrogenation of hydrocarbons. More particularly, it relates to a process for the recovery of lithium from lithium carbonate formed during iodinative dehydrogenation of hydrocarbons in the presence of a molten lithium iodide/lithium hydroxide system.

Various processes for the dehydrogenation of hydrocarbons by contacting a first hydrocarbon with elemental iodine in the presence of a metal oxide hydrogen iodide acceptor in a dehydrogenation zone, thereby forming a second hydrocarbon having a higher carbon to hydrogen ratio and metal iodide, and contacting the metal iodide with oxygen thereby oxygenatively releasing elemental iodine from the metal iodide for further use in the dehydrogenation step are well known. For example, Baijle et al., U.S. Patent No. 3,130,241 issued Apr. 21, 1963, and Nager, U.S. Patent No. 3,080,435 issued Mar. 5, 1963, describe such processes. These patents describe various metal oxide-metal iodide salts useful as hydrogen iodide acceptors in both solid and liquid state processes. Molten mixtures of lithium iodide/lithium hydroxide (or oxide) have been found to be especially useful.

In the iodinative dehydrogenation operation with a molten lithium salt system, minor amounts of heavy organic residues with a high carbon to hydrogen ratio are formed and are entrained in the flowing molten lithium iodide-lithium hydroxide mixture. Combustion of these residues during the oxidative regeneration of iodine from the lithium iodide produces carbon dioxide which immediately reacts with lithium hydroxide to form lithium carbonate. The concentration of lithium carbonate in the molten salt is dependent upon operating conditions and lithium hydroxide concentration, but usually varies between one and eight weight percent. At these levels, lithium carbonate is completely soluble in the molten salt.

However, in order to prevent excessive accumulation of corrosion product debris (e.g., lithium ferrite) in the melt and to remove the bulk of the carbonaceous material prior to oxidation, a portion of the molten salt passing from the dehydrogenation zone to the oxidation zone is continuously by-passed to an aqueous solution for clean-up. The lithium iodide and lithium hydroxide in this portion are dissolved in the aqueous solution and the insoluble corrosion products, lithium carbonate and carbonaceous materals are filtered out as a drop-out sludge. The resulting basic lithium iodide-lithium hydroxide solution may then be used as a quench for the gaseous hydrocarbon products or may be treated by conventional means such as flashing, distillation, etc., to concentrate the lithium iodide-lithium hydroxide salt which is then returned to the molten salt flowing to the oxidation zone of the reactor. Unfortunately, the solubility of lithium carbonate in the aqueous lithium iodide solution (25% wt. LiI) at 86° F. is only about 0.1% by weight and decreases with increasing temperature. It is apparent, therefore, that lithium carbonate will be filtered out in the above process and accumulate in the drop-out sludge. In fact, lithium carbonate represents about 75% by weight of this material, the remainder being carbonaceous materials and various reactor corrosion products.

Since the amount of lithium used to make the molten iodide-hydroxide salt in a commercial process is large, it is economically essential that the lithium from the lithium carbonate be recovered, either as lithium iodide or as hydroxide and returned to the reactor for further use.

Various methods have been proposed for recovering lithium from the lithium carbonate in the sludge. Lithium carbonate could be reacted with hydrogen iodide, if readily available, thereby forming lithium iodide, carbon dioxide and water. Alternatively, calcium hydroxide reacts with lithium carbonate to form lithium hydroxide and calcium carbonate. A more complex scheme is to react lithium carbonate with sulfuric acid to form lithium sulfate which is further reacted with barium hydroxide to form lithium hydroxide and barium sulfate. All of these methods have the disadvantage of careful pH control, extra processing steps and may very well dissolve some of the undesirable corrosion products in the sludge, thereby requiring an even more elaborate processing scheme to remove these dissolved impurities before returning the recovered lithium hydroxide or iodide back to the reactor.

It is an object of this invention to provide a simple and direct method for the recovery of lithium from lithium carbonate in the form of lithium hydroxide when used in an iodinative dehydrogenation process.

It is a further object of this invention to provide a process for the direct conversion of lithium carbonate to lithium hydroxide in an iodinative dehydrogenation process wherein the lithium carbonate need not first be separated as part of a sludge before conversion.

It is also an object of this invention to provide a process for the recovery of lithium from lithium carbonate in a molten lithium iodide-lithium hydroxide system wherein extra processing and separation steps are substantially eliminated. Other objects and advantages of the invention will become apparent from the detailed description which follows.

It has now been found that lithium carbonate, formed in an iodinative dehydrogenation process carried out in intimate contact with a molten lithium iodide-lithium hydroxide mixture and involving oxygenative regeneration of iodine from formed lithium iodide, can be recovered directly as lithium hydroxide by steaming the resulting contaminated molten mixture at reaction temperatures and pressures followed by mixing with water in liquid phase to dissolve the lithium iodide and lithium hydroxide and separating insoluble contaminants from the aqueous solution.

When operated in this manner, the insoluble sludge which is separated as by filtration, contains little or no lithium and need not be further processed.

The steaming treatment is preferably carried out at temperatures and pressures which are used to carry out the iodinative dehydrogenation reaction. These conditions may vary considerably depending on the particular hydrocarbon being dehydrogenated. The temperatures are in excess of 200° C. and generally vary between 450° C. and 650° C. The pressures are usually between atmospheric and about 100 p.s.i.g.; however, other pressures and temperatures may be used without departing from the scope of the invention.

Steam is superheated to the temperature of the molten salt and then introduced into the molten salt mixture. The steam circulating throughout the salt is usually sufficient to cause mixing to take place thereby assuring adequate steam-molten salt contact. However, if desired, the zone in which the lithium carbonate hydrolysis takes place may be provided with mixing means such as mechanical stirrers. The steam to salt weight ratio may vary over a wide range and is preferably from 0.06 to 0.50. The molar ratio of steam to lithium carbonate present will depend upon the percentage of carbonate in the molten salt. For example, for an initial salt composition containing 2% by weight lithium carbonate the above steam quantities represent about 12–100 times the stoichiometric requirement for the conversion of the lithium carbonate. The conversion of lithium carbonate to lithium hydroxide increases progressively with increasing steam-to-carbonate molar ratio. Molar ratios of steam to carbonate between 20 and 150 are especially useful with those between 50 and 120 being preferred.

The reaction of lithium carbonate with steam is equilibrium limited. High conversions are obtainable under conditions that rapidly remove carbon dioxide from the system; high steam throughputs insure rapid removal of the carbon dioxide. In general, residence times for the steam may vary from 0.01 to 15 seconds with times from 0.1 to 3 seconds being preferred. The gas used to provide high gas flows may be pure steam or it may be steam admixed with inert gases such as nitrogen, argon, etc.

It is to be noted that while pressures to be preferred are those of the process system, this is for convenience only, as the hydrolysis reaction is pressure independent.

The following examples serve to more clearly describe the invention.

Example I

The results described in the table below were obtained by steam-stripping for 30 minute periods, molten lithium iodide-lithium hydroxide salts typical to those used in iodinative dehydrogenation compositions. The salt volumes varied between 550 and 800 mls. and the reaction was carried out at 1000–1100° F. at 70 p.s.i.g. The salt was contained in a 1⅓ liter stainless steel baffled autoclave fitted with an air driven stirrer. Steam metered as water was superheated to salt temperature and introduced into the reactor through a ¼ inch stainless steel dip-tube extending to about one inch from the bottom of the autoclave. Salt samples were obtained before and after each run to determine the extent of lithium carbonate conversion. For runs 5–10, salt mixing was achieved only by the stripping action of the steam while for runs 1–4, 11 and 12, additional mixing was supplied via the stirrer rotating at 500 r.p.m.

admixed with nitrogen and added at the rate of 192 moles of steam per hour, the molar ratio of steam to nitrogen being 0.205. The steam stripping reduced the $Li_2CO_3$ level and resulted in an increase in LiOH. Part way through the steaming operation, part of the molten salt was dropped out into water and neutralized with hydrogen iodide in order to prevent an excessive buildup of LiOH in the molten system. The LiI formed as a result of the neutralization was then recycled back to the reactor.

Results of the steaming were as follows:

| Time (hours) | $Li_2CO_3$, Percent w. | LiOH, Percent w. |
| --- | --- | --- |
| 0 | 7.51 | [1] 4.36 |
| 3 | 7.39 | [1] 4.99 |
| 18 | 4.49 | [1] 6.10 |
| 26 | 3.34 | [2] 6.31 |
| 40 | 2.03 | [2] 6.76 |
| 69 | 0.81 | [2] 4.94 |

[1] Steam strip only.
[2] Steam strip with dropout and replacement.

The conversion of lithium carbonate was about 90%. The molar ratio of steam to original lithium carbonate used was 24.

It is evident from the above results that the process of this invention is effective in removing excessively high $Li_2CO_3$ concentrations, thereby recovering the lithium and converting it into a form useful for further reaction in an iodinative dehydrogenation process.

We claim as our invention:

1. In an iodinative dehydrogenation process carried out in the presence of a molten lithium iodide-lithium hydroxide salt, the improvement which comprises converting lithium carbonate entrained in said salt to lithium hydroxide by passing steam through said salt at an elevated temperature.

2. A process according to claim 1 wherein the steam to carbonate molar ratio is between 20:1 to 150:1.

3. A process according to claim 1 wherein the conversion is carried out at a temperature of from about 450 to about 650° C.

4. A process according to claim 1 wherein the residence time of the steam is between about 0.1 and 3.0 seconds.

5. A process according to claim 1 wherein the steaming is carried out at a rate sufficient to maintain a molar ratio of 50 to 120 moles of steam per mole of lithium carbonate at a residence time of from 0.1 to 3.0 seconds and at a temperature of from about 450 to about 650° C.

6. A process according to claim 1 wherein the steam is introduced in the presence of an inert gas.

TABLE I.—CONVERSION OF LITHIUM CARBONATE VIA STEAM-STRIPPING

[Reactor pressure: 70 p.s.i.g. Run time: 30 minutes]

| Run Number | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Salt Temperature, °F | 1,005 | 1,010 | 1,010 | 1,110 | 1,110 | 1,100 | 1,100 | 1,100 | 1,080 | 1,100 | 1,100 | 1,100 |
| Steam/Salt, weight | 0.06 | 0.50 | 0.48 | 0.07 | 0.12 | 0.16 | 0.28 | 0.24 | 0.50 | 0.48 | 0.48 | 0.45 |
| Steam/$Li_2CO_3$, mole | 18 | 102 | 103 | 14 | 25 | 34 | 58 | 61 | 100 | 100 | 105 | 106 |
| Flow rate, cc./min. (×10⁻³) | 2.8 | 23.0 | 19.0 | 2.9 | 5.5 | 9.5 | 18.9 | 15.1 | 25.6 | 29.6 | 18.6 | 24.7 |
| Contact Time, sec | 15 | 2.0 | 1.9 | 13 | 7.3 | 4.5 | 2.4 | 3.0 | 1.6 | 1.5 | 1.8 | 1.9 |
| Salt Composition, percent weight: | | | | | | | | | | | | |
| Initial: | | | | | | | | | | | | |
| LiI | 94.2 | 93.8 | 93.8 | 93.9 | 93.9 | 93.9 | 93.9 | 93.9 | 93.9 | 93.9 | 94.0 | 93.9 |
| LiOH | 4.48 | 4.12 | 4.28 | 4.20 | 4.17 | 4.18 | 3.96 | 4.50 | 4.25 | 4.07 | 4.30 | 4.30 |
| $Li_2CO_3$ | 1.39 | 2.03 | 1.90 | 1.99 | 2.01 | 1.92 | 2.22 | 1.66 | 2.00 | 2.10 | 1.87 | 1.76 |
| Final: | | | | | | | | | | | | |
| LiI | 94.1 | 94.4 | 94.4 | 94.4 | 94.5 | 94.5 | 94.4 | 94.2 | 94.3 | 94.1 | 94.2 | 94.6 |
| LiOH | 4.97 | 5.30 | 5.30 | 4.66 | 4.93 | 4.97 | 5.33 | 5.20 | 5.43 | 5.29 | 5.73 | 5.24 |
| $Li_2CO_3$ | 0.87 | 0.35 | 0.35 | 0.92 | 0.66 | 0.47 | 0.39 | 0.41 | 0.25 | 0.21 | 0.04 | 0.18 |
| Conversion of $Li_2CO_3$, percent weight | 37 | 83 | 82 | 54 | 67 | 76 | 82 | 75 | 88 | 90 | 98 | 90 |

Example II

The lithium carbonate concentration in a molten system consisting of lithium iodide-lithium hydroxide used in the iodinative dehydrogenation of butenes to butadiene was allowed to reach an excessive level during dehydrogenation operations. The molten system was then steam stripped in an inert atmosphere with superheated steam at a temperature of from 560 to 590° C. The steam was References Cited

UNITED STATES PATENTS 3,080,435 3/1963 Nager _____ 260—673.5
3,168,584 2/1965 Nager _____ 260—673
3,310,596 3/1967 King _____ 260—680

DELBERT E. GANTZ, Primary Examiner.

G. E. SCHMITKONS, Assistant Examiner.